United States Patent [19]

Organek et al.

[11] Patent Number: 5,713,446
[45] Date of Patent: Feb. 3, 1998

[54] LOW INERTIA BALL RAMP ACTUATOR

[75] Inventors: Gregory J. Organek, Detroit; David M. Preston, Clarkston, both of Mich.

[73] Assignee: Eaton Corporation, Cleveland, Ohio

[21] Appl. No.: 700,250

[22] Filed: Aug. 20, 1996

[51] Int. Cl.[6] .................... F16D 13/04; F16D 27/112; F16D 43/20
[52] U.S. Cl. .................... 192/35; 192/54.52; 192/84.7; 192/93 A
[58] Field of Search .................... 192/35, 54.52, 192/70.23, 84.7, 84.91, 84.93, 93 A

[56] References Cited

U.S. PATENT DOCUMENTS

| | | | |
|---|---|---|---|
| 2,045,086 | 6/1936 | Kastner | 192/93 A X |
| 2,738,045 | 3/1956 | Mergen et al. | 192/35 |
| 2,933,171 | 4/1960 | Kraeplin | 192/35 |
| 3,000,479 | 9/1961 | Mosbacher | 192/35 |
| 4,645,049 | 2/1987 | Matsuda et al. | 192/35 |
| 4,805,486 | 2/1989 | Hagiwara et al. | 475/150 |
| 5,078,249 | 1/1992 | Botterill | 192/93 A |
| 5,092,825 | 3/1992 | Goscenski et al. | 475/150 |
| 5,485,904 | 1/1996 | Organek et al. | 192/35 |
| 5,638,933 | 6/1997 | Matsumoto et al. | 192/54.52 X |

*Primary Examiner*—Rodney H. Bonck
*Attorney, Agent, or Firm*—Loren H. Uthoff, Jr.; Howard D. Gordon

[57] ABSTRACT

A ball ramp actuator having first and second actuation plates with a control plate disposed therebetween where a plurality of circumferential variable depth grooves are formed in a first face of the first actuation plate and in first and second faces of the control plate where the grooves formed in the first face of the control plate are directly opposed to the grooves formed in the second face of the control plate where the actuation grooves and the control grooves form opposed pairs of grooves having a rolling member disposed within each pair of grooves for axially separating the first and second actuation plates from the control plate as the rolling members traverse their respective grooves such that the rolling members contacting the first face of the control plate directly oppose the rolling elements contacting the second face of the control plate to provide a balanced axial force on the control plate.

16 Claims, 4 Drawing Sheets

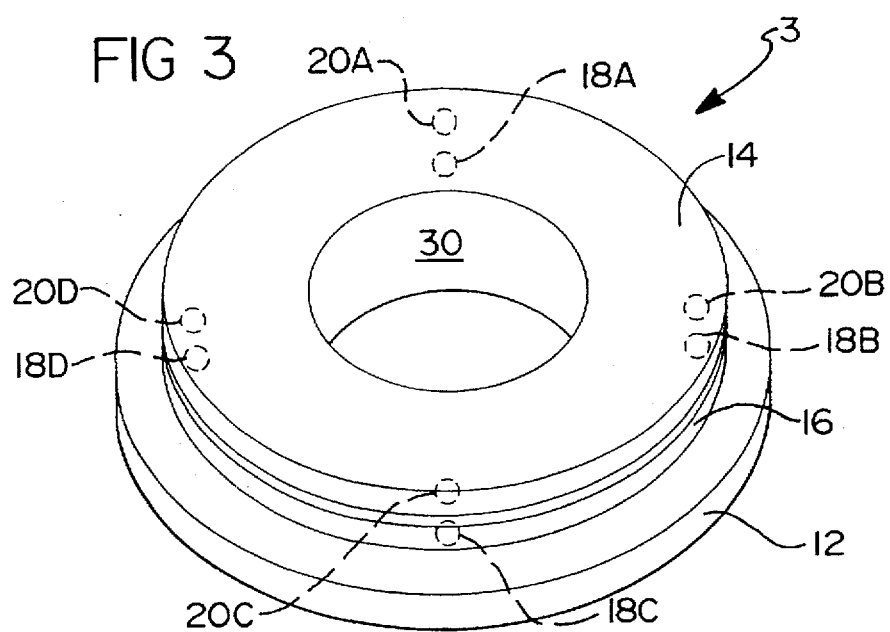
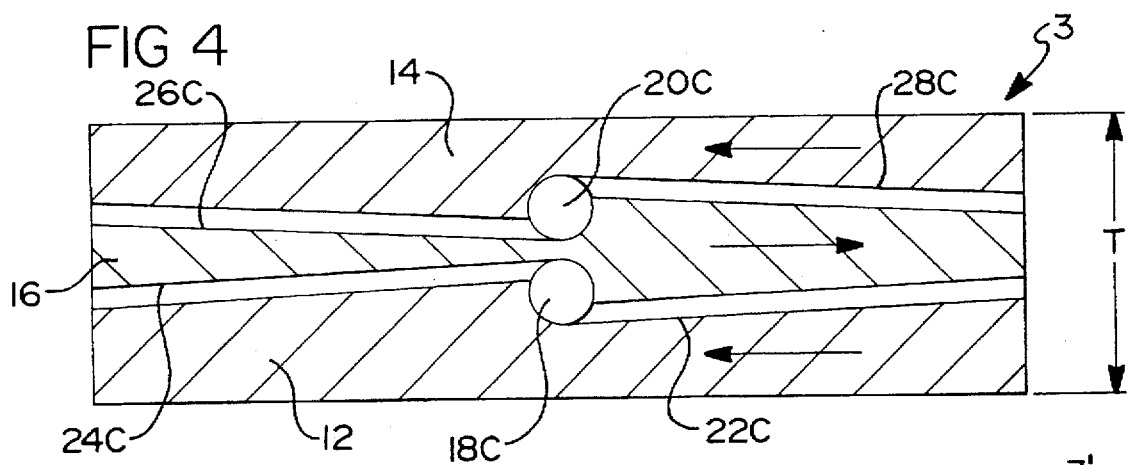
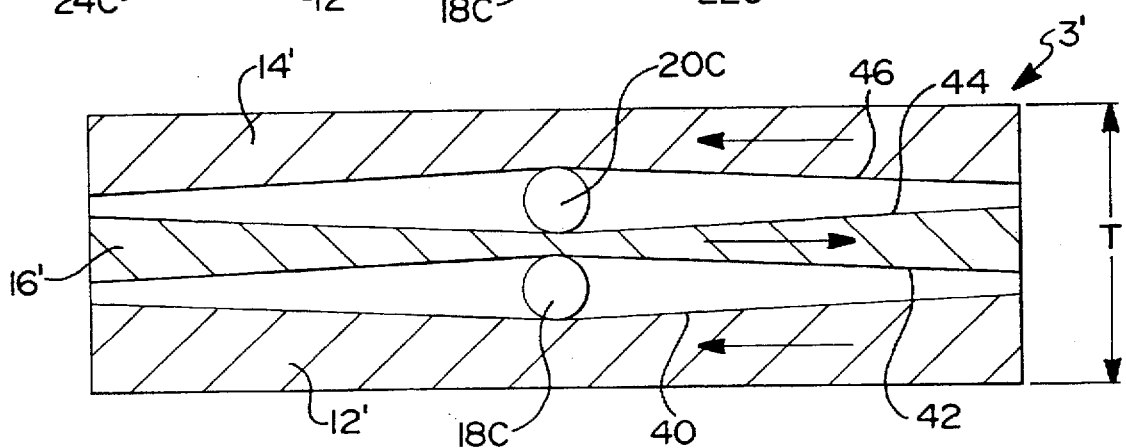

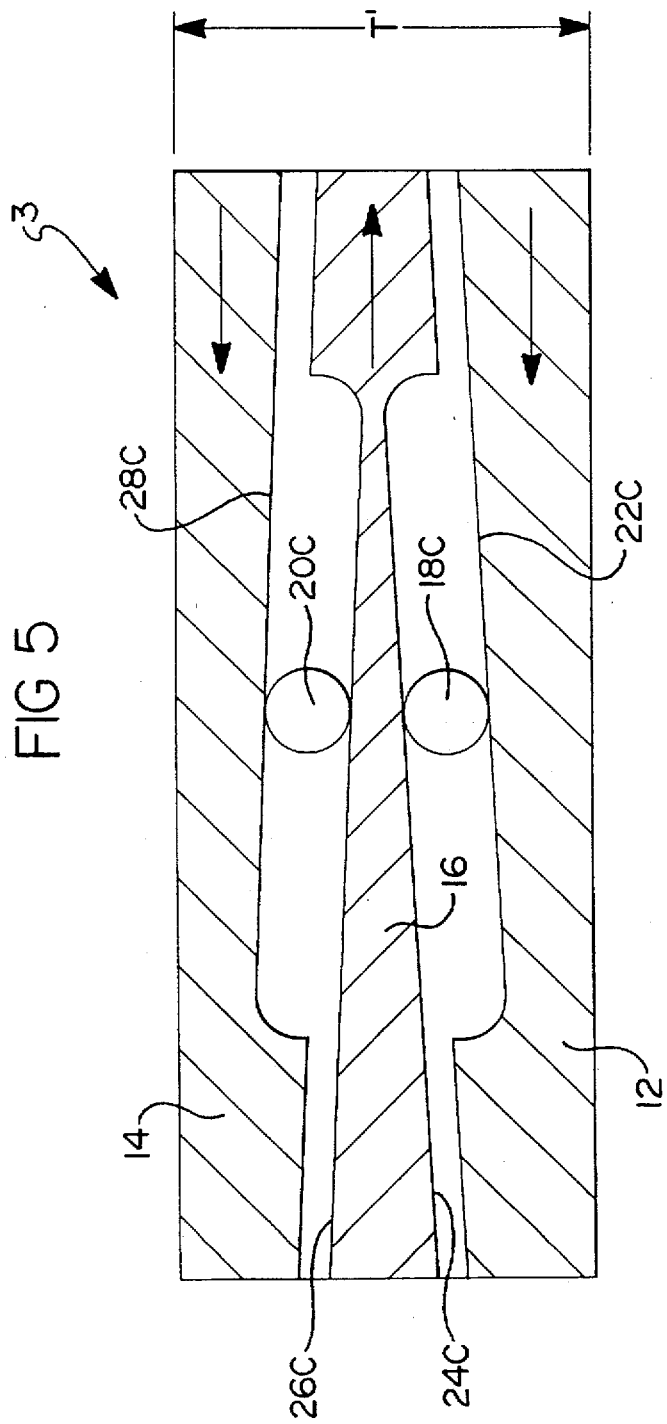

LOW INERTIA BALL RAMP ACTUATOR

BACKGROUND OF THE INVENTION

1. Field of the Invention

The present invention relates to a ball ramp actuator. More specifically, the present invention relates to a ball ramp actuator where control grooves are formed in both sides of a control plate to minimize the inertia of the control plate for improved response.

2. Description of the Prior Art

Reference is made to U.S. Pat. Nos. 2,933,171; 3,000,479; 2,045,086; 4,645,049; and 2,738,045, the disclosures of which are hereby incorporated by reference, as examples of ball ramp actuators utilized to couple a first rotating shaft to a second shaft. The ball ramp actuator consists of two opposing plates having a plurality of rolling elements disposed therebetween which engage variable depth grooves formed in the face of both plates thereby causing the axial separation of the plates to vary as one plate is rotated relative to the other plate. One side of the ball ramp actuator, commonly called a control plate, is reacted against case ground through a force generated by an electric motor driving through a gear reduction or an electromagnetic field generated by a coil. The electrical current supplied to the motor or the coil causes the control plate to be coupled to case ground which results in relative rotation between the control plate and an actuation plate thereby causing the rolling elements to traverse grooves formed in the control and actuation plates which change the axial separation between the control and actuator plates to load a clutch pack.

More specifically, the ball ramp actuator is comprised of a plurality of rolling elements, a control plate, and an opposed actuation plate where the actuation plate and the control plate define at least three opposed single or dual groove surfaces formed as circumferential semi-circular grooves, each pair of opposed grooves containing one roller element. The plates must be robust to carrying the forces involved and necessarily are slow to move unless an actuator which generates a rapid, high force input is used to control the rotation of one of the plates.

SUMMARY OF THE INVENTION

The present invention provides for a control plate of a ball ramp actuator having a decreased movement of inertia for rapid control of the activation and deactivation of a ball ramp actuator. The control plate has opposed variable depth grooves formed in both faces to permit the use of two opposed rolling elements to provide the required axial separation between one control plate and two adjoining actuation plates, one disposed on each side of the control plate. By utilizing two opposed rolling elements in each opposed pair of grooves, the control plate thickness can be minimized for improved ease of control due to a lowered movement of rotational inertia. Also, the ball ramp actuator of the present invention is less susceptible to inadvertent actuation upon high rotational acceleration of the input shaft.

According to the present invention, the response of the rotation of the control plate by an outside controllable force such as that generated by an electric motor acting through a gear set or an electromagnetic field generated by passing an electrical current through a coil can be improved by reducing its rotational movement of inertia. Two rolling elements are positioned on direct opposite sides of the control plate and roll along matching grooves formed on both sides of the control plate directly opposing one another. Since the axial forces generated by the rolling elements directly oppose each other, the control plate loads are balanced and minimal braking strength is needed as compared to the prior art systems. The inertia of the control plate is lowered by a significant amount by using the teaching of the present invention. In driveline master clutch applications, the thrust bearing used to support the actuation plate can be eliminated by using the dual actuation plate design of the present invention.

BRIEF DESCRIPTION OF THE DRAWINGS

FIG. 3 is a perspective view of the ball ramp actuator of the present invention;

FIG. 4 is a cross-sectional view of the ball ramp actuator of the present invention in a deactivated state;

FIG. 5 is a cross-sectional view of the ball ramp actuator of the present invention in an activated state;

FIG. 6 is a cross-sectional view of a first alternate embodiment of the ball ramp actuator of the present invention.

DETAILED DESCRIPTION OF THE PREFERRED EMBODIMENT

Figure 1:
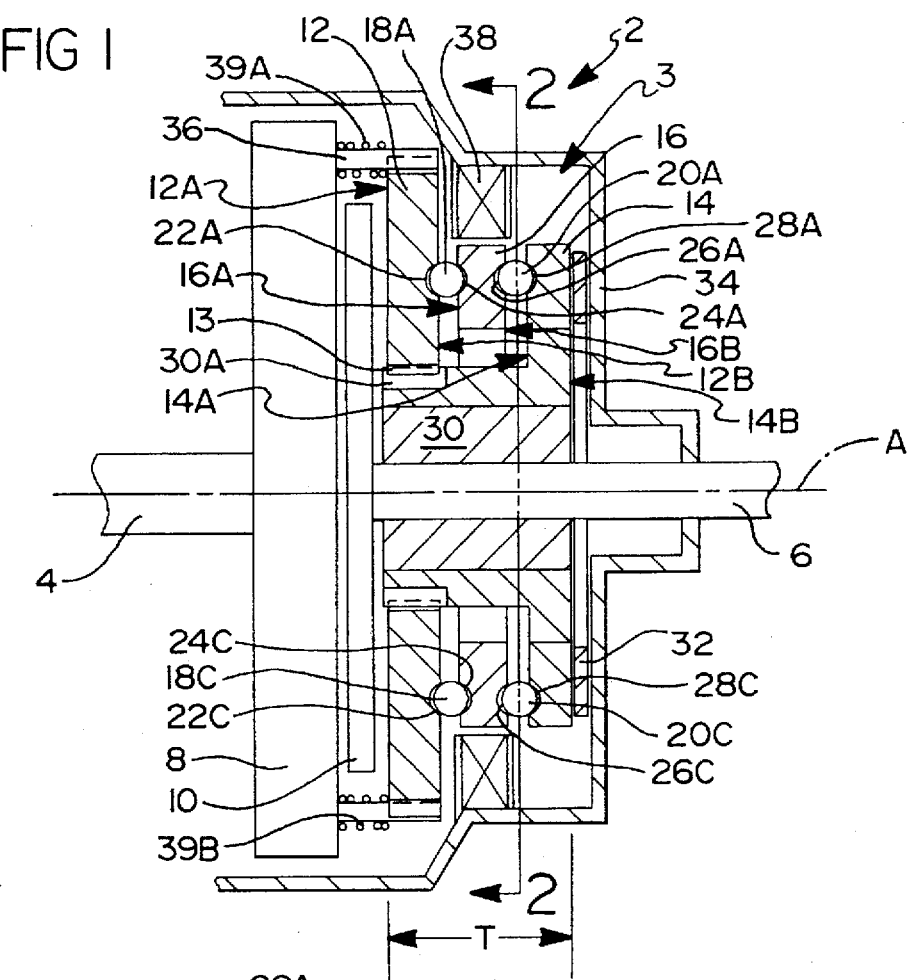
FIG. 1 is a cross-sectional view of the ball ramp actuator of the present invention adapted to function in a shaft coupling clutch assembly.

For purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

In this disclosure, certain terminology will be used in the following description for convenience in reference only and will not be limiting. The terms "rightward" and "leftward" will refer to directions in the drawings in connection with which the terminology is used. The terms "inwardly" and "outwardly" will refer to directions toward and away from, respectively, the geometric center of the ball groove assembly of the present invention. The terms "upward" and "downward" will refer to directions as taken in the drawings in connection with which the terminology is used. All foregoing terms mentioned above include the normal derivatives and equivalents thereof. The term rolling member as used herein shall include all types of rolling members including spherical and cylindrical shaped elements.

Now referring to FIG. 1 of the drawings, a cross-sectional view of a clutch assembly 2 including the ball ramp actuator 3 of the present invention is shown. A rotating input shaft 4 is frictionally coupled to an output shaft 6 through a flywheel 8 and the clutch disc 10 by the axial expansion of the ball ramp actuator 3 all of which rotate about an axis of rotation A. Reference is made to U.S. Pat. Nos. 4,805,486; 5,078,249 and 5,092,825, the disclosures of which are hereby incorporated by reference, for a detailed teaching of the operation of ball ramp actuators as used in vehicle drivelines.

In a vehicle driveline or in other applications where a powered rotating shaft is to be coupled to a nonpowered shaft the ball ramp actuator 3 of the present invention can be used to load a mainline clutch to frictionally couple the shafts. The first actuation plate 12 is adapted to function as a clutch pressure plate to load a clutch disc 10 against a flywheel 8. The second actuation plate 14 reacts against a ground surface such as the clutch housing 34 through a thrust bearing 32 when a magnetic field created by an electrical coil 38 thereby inducing relative rotation between the actuation plates 12 and 14 and the control plate 16. The actuation plates 12 and 14 are linked to rotate together relative to the control plate 16.

The control plate 16 is annular in shape and has a plurality of opposed grooves formed on both a first face 16A and a second face 16B. The first and second actuation plates 12 and 14 are positioned to cause clutch disc 10 to be loaded against flywheel 4 upon activation of the ball ramp actuator 3. The first actuation plate 12 has a first face 12A which presses against the clutch disc 10 when the ball ramp actuator 3 is activated and a second face 12B which is opposite the control plate 16. The control plate 16 has a first face 16A which oppose the second face 12B of the actuation plate 12 and a second face 16B which opposes a first face 14A of the second actuation plate 14. A second face 14B of the second actuation plate 14 contacts the thrust bearing 32 which reacts against the clutch housing 34. The first actuation plate 12 and the second actuation plate 14 axially separate from the control plate 16 as the first and second actuation plates 12 and 14 are simultaneously rotated relative to the control plate 16 due to the displacement of the rolling members 18A, 18C, 20A and 20C along respective variable depth grooves 22A, 22C, 24A, 24C, 26A, 26C, 28A and 28C. The axial expansion of the ball ramp actuator 3 reacts against the clutch housing 34 through the thrust bearing 32 to clamp the clutch disc 10 between the first actuation plate 12 and the flywheel 8. If the housing 34 is attached and rotates with the flywheel 4, then the thrust bearing 32 can be eliminated and the second actuation plate 14 can be connected to the housing 34 (see FIG. 7). The first actuation plate 12 is nonrotatably linked to the flywheel 8 through strut 36 which allows for axial movement of the first actuation plate 12 relative to the flywheel 8 yet nonrotatably links the flywheel 8 and the first actuation plate 12. Return springs 39A and 39B bias the first actuation plate 12 away from the flywheel 8. The first actuation plate 12 is nonrotatably linked to the second actuation plate 14 by the collar 30 which allows for relative axial movement between the first actuation plate 12 and the second actuation plate 14 through mating splines 13 formed on the first actuation plate 12 and splines 30A formed on the collar 30 which axially extends and is part of the second actuation plate 14.

An electrical coil 38 is used to generate an electromagnetic field that couples the control plate 16 to the housing 34 to provide a retarding force to the control plate 16 through a reaction force with the clutch housing 34 assuming there is relative rotation between the input shaft 4 and the output shaft 6 thereby inducing a relative rotation between the control plate 16 and the first and second actuation plates 12 and 14 which rotate together. As relative rotation occurs, the rolling members 18A, 18C, 20A and 20C traverse their respective variable depth grooves 22A,24A; 22C,24C; 26A, 28A and 26C, 28C to axially separate the first actuation plate 12 and the control plate 16 from the second actuation plate 14 toward the flywheel 8 thereby increasing the total thickness T of the ball ramp actuator 3 and clamping the clutch disc 10 between the first actuation plate 12 and the flywheel 8.

Upon deenergization of the coil 38, the first actuation plate 12 is forced away from the flywheel 8 by return springs 39A and 39B as the rolling members 18A, 18C and 20A, 20B traverse the variable depth grooves 22A,24A; 22C,24C; 26A,28A and 26C,28C in a direction resulting in a decrease in the total thickness T of the ball ramp actuator 3.

Figure 2:
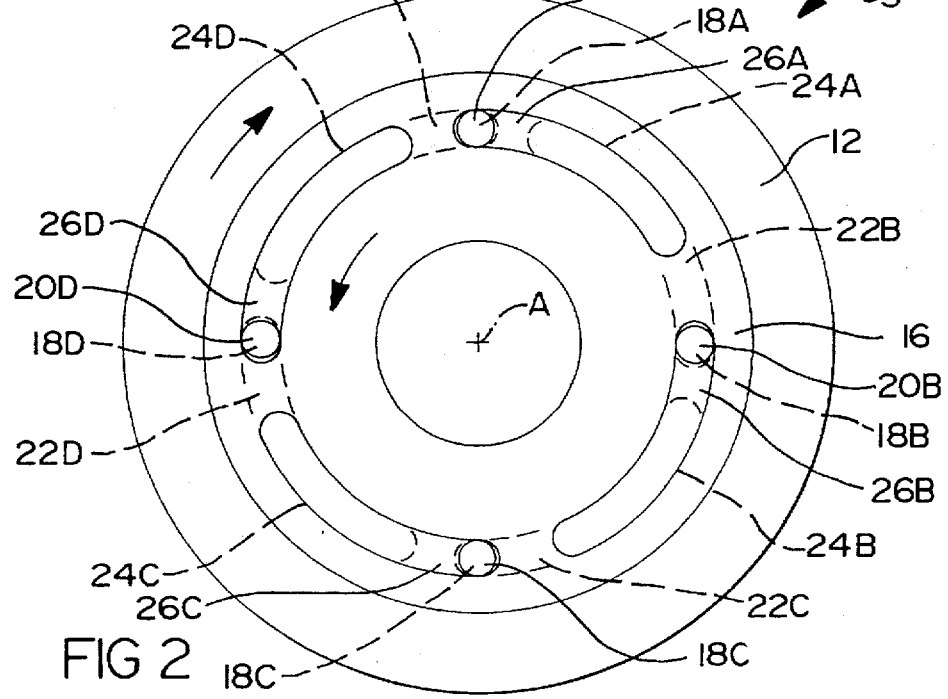
FIG. 2 is a cross-sectional view of the ball ramp actuator of FIG. 1 taken along line II—II.

Now referring to FIG. 2, a cross-sectional view of the ball ramp actuator 3 of the present invention is shown. The control plate 16 has a plurality of control grooves 24A, 24B, 24C and 24D formed in a first face and an axially opposed and identically shaped plurality of control grooves 26A, 26B, 26C and 26D formed in a second face of the control plate 16. The first actuation plate 12 has a plurality of actuation grooves 22A, 22B, 22C and 22D formed in the face that opposes the control plate 16 where the actuator grooves 22A, 22B, 22C and 22D at least partially oppose and are substantially identical in shape and circumferential location to the control grooves 24A, 24B, 24C and 24D. Likewise, the second actuation plate 14 has a plurality of actuation grooves 28A, 28B, 28C and 28D (not shown) formed in the face that opposes the control plate 16 where the actuation grooves 28A, 28B, 28C and 28D at least partially oppose and are substantially identical in shape and circumferential location to the control grooves 26A, 26B, 26C and 26D. In FIG. 2, control grooves 24A, 24B, 24C and 24D formed in the first face 16A of control plate 16 are congruent with control grooves 26A, 26B, 26C and 26D formed in the second face 16B of control plate 16 and thus are shown as hidden lines.

As the control plate 16 rotates relative to the actuation plates 12 and 14 which are nonrotatably linked together, the rolling members 18A, 18B, 18C and 18D traverse their respective control grooves 24A, 24B, 24C and 24D and in a similar manner traverse the opposing actuation grooves 22A, 22B, 22C and 22D thereby causing the thickness T to increase or decrease depending on the direction of the relative rotation between the control plate 16 and the first actuation plate 12.

Simultaneously, rolling members 20A, 20B, 20C and 20D traverse their respective control grooves 26A, 26B, 26C and 26D and in a similar manner the opposing actuation grooves 28A, 28B, 28C and 28D causing the thickness T to increase or decrease depending on the direction of the relative rotation between the control plate 16 and the second actuation plate 14 and the starting point of the rotation. Note that the grooves only function to increase the separation of the ball ramp actuator 3 when the relative rotation of the control plate 16 and the first and second actuation plates 12 and 14 are in one direction from the starting point or an intermediate position. This unidirectional configuration is in contrast to a bidirectional unit as described in relation to FIG. 5.

Now referring to FIG. 3, a perspective view of the ball ramp actuator 3 of the present invention is shown. The first actuation plate 12, the second actuation plate 14 and the control plate 16 are shown as annular in shape as are the other rotating elements. The splines 30A are formed in the second actuation plate 14 specifically in a collar section 30 (see FIG. 1) where the collar 30 axially extends as part of the second actuation plate 14 to engage mating sphines 13 formed in an inner surface of the first actuation plate 12. Thus, the first and second actuation plates 12 and 14 are nonrotatably linked by splines 13 and 30A. The first actuator plate 12 is free to axially slide on the collar 30 to engage and disengage the clutch disc 10. Also shown are rolling members 18A, 18B, 18C, 18D, 20A, 20B, 20C and 20D located axially opposite one another in pairs.

According to the present invention, the overall force on the control plate 16 generated by each pair of rolling members 18A,20A; 18B,20B; 18C,20C and 18D,20D is balanced thereby balancing the overall axial force on the control plate 16 which allows the thickness of the control plate 16 to be reduced thereby decreasing the movement of inertia of the control plate 16 for faster response and lower weight.

Now referring to FIG. 4 of the drawings, a cross-sectional view of the ball ramp actuator 3 of the present invention is shown in a deactivated state. The control plate 16 is separated from a first actuation plate 12 and a second actuation plate 14 by a plurality of rolling members 18A, 18B, 18C, 18D, 20A, 20B, 20C and 20D which engage a plurality of corresponding variable depth grooves 22A, 22B, 22C, 22D, 24A, 24B, 24C, 24D, 26A, 26B, 26C, 26D, 28A, 28B, 28C and 28D. As the control plate 16 rotates from the starting point shown in FIG. 4 relative to the actuation plates 12 and 14, the axial thickness T of the ball ramp actuator 3 increases to load a clutch disc 10 or, for example, a clutch pack (not shown) so as to couple an input shaft 4 to an output shaft 6 (see FIG. 1). As the electrical current to the coil 38 is decreased, the thickness T decreases as the return springs 39A and 39B force the first actuator plate 12 away from the flywheel 8.

Now referring to FIG. 5 of the drawings, the ball ramp actuator 3 of the present invention is shown in a partially activated state. The first actuation plate 12 and the second actuation plate 14 have rotated relative to the control plate 16. The rolling members 18C and 20C have traversed the control grooves 24C and 26C respectively to maintain an opposed position to one another to balance out the axial forces on the control plate 16. Simultaneously, the rolling member 18C has partially traversed the actuation groove 22C while the rolling member 20C has partially traversed the actuation groove 28C. The thickness T' has increased relative to the thickness T of the ball ramp actuator 3 shown in a deactivated state in FIG. 4.

In FIG. 6, an alternate embodiment of the ball ramp actuator 3' of the present invention is shown. The ball ramp actuator 3' is bidirectional where rotation of the control plate 12' in either direction relative to the actuation plates 12' and 14' from the starting point shown in FIG. 3. The control grooves 42 and 44 are double tapered to provide for axial movement of the roller elements 18C and 20C in either direction of rotation. Not shown in FIG. 5 are the additional rolling members 18A, 18B, 18D, 20A, 20B and 20D which function in identical manner to rolling members 18C and 20C. By using the alternate embodiment of the ball ramp actuator 3' of the present invention, the input shaft 4 can be frictionally coupled to the output shaft 6 such that relative motion of the input shaft 4 to the output shaft 6 causes the rolling members 18A, 18B, 18C, 18D, 20A, 20B, 20C and 20D to move on their respective control grooves 42 and 44 and simultaneously on the actuation grooves 40 and 46 to increase the overall thickness T' of the ball ramp actuator 3'. The first and second actuation plates 12' and 14' are connected together to rotate with one another to maintain position of the paired rolling members 18A, 20A and 18B, 20B and 18C, 20C and 18D, 20D in relation to the control plate 16' to balance the axial forces on the control plate 16' similar to that discussed in relation to the preferred embodiment.

Figure 7:
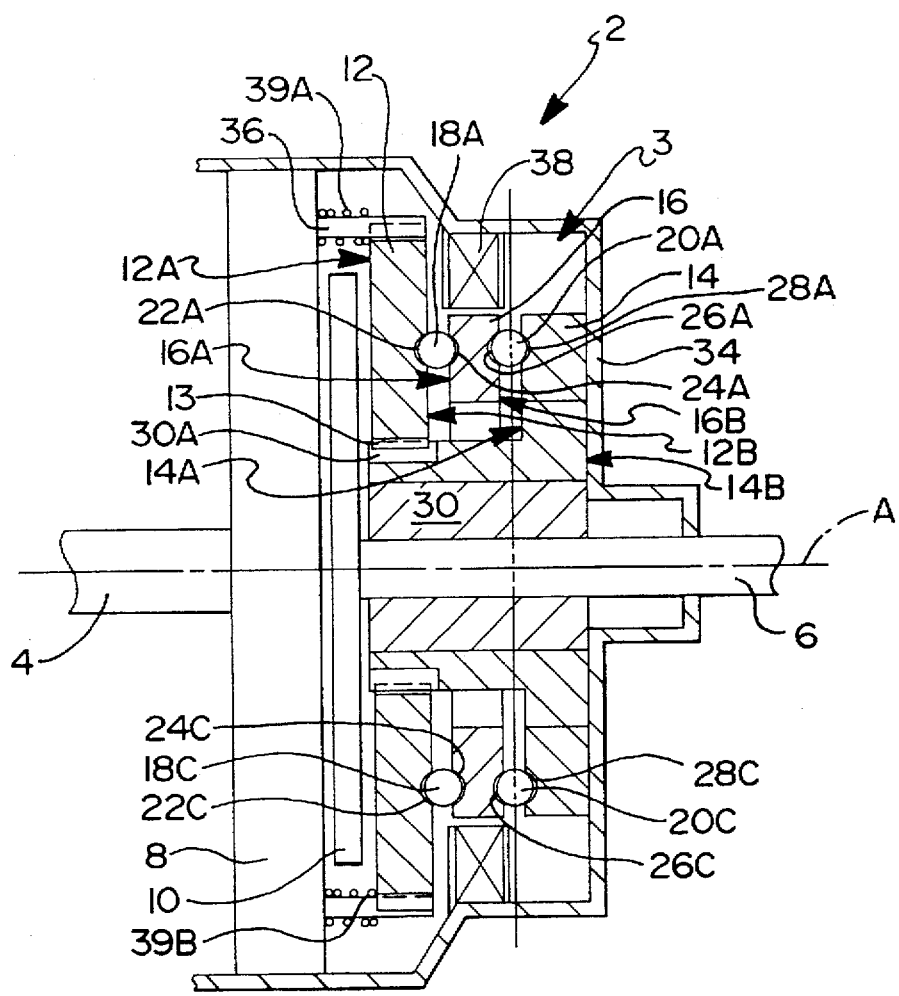
FIG. 7 is a cross-sectional view of a driveline master clutch utilizing the ball ramp actuator of the present invention.

Now referring to FIG. 7 of the drawings, a cross-sectional view of a driveline master clutch 2' which utilizes the ball ramp actuator 3 of the present invention to clamp a clutch disc 10 between the first actuation plate 12 and the engine flywheel 8'. The clutch housing 34' is attached to and rotates with the flywheel 8. Thus, in this embodiment, the coil 38 rotates with the flywheel 8 and magnetically couples the rotating clutch housing 8 to the control plate 16. Relative rotation between the flywheel 8 and the output shaft 6 results in actuation of the ball ramp actuator 3 depending on the level of energization of the coil 38.

The second actuation plate 14' is attached directly to the clutch cover 34' and rotates therewith. The output shaft 6 is connected to, or forms part of the input shaft to a gear change transmission (not shown).

The present invention has been described in great detail, sufficient to enable one skilled in the art to make and use the same. Various alterations and modifications of the invention will occur to those skilled in the art upon the reading and understanding of the foregoing specification, and it is intended to include all such alterations and modifications as part of the invention, insofar as they fall within the scope of the following claims.

We claim:

1. A ball ramp clutch actuator comprising:

an input shaft rotatable about an axis of rotation;

an output shaft rotatable about said axis of rotation;

a flywheel nonrotatably coupled to said input shaft rotatable with said input shaft about said axis of rotation;

a clutch disc nonrotatably coupled to said output shaft, said clutch disc having first and second surfaces where said first surface frictionally engages said flywheel;

a housing substantially covering said flywheel and said clutch disc;

a ball ramp actuator rotatable about said axis of rotation comprising a first actuation plate axially displaceable to cause a first face of said actuation plate to frictionally engage said second surface of said clutch disc, said first actuation plate having a plurality of variable depth circumferential actuation grooves formed in a second face, said second face being opposite said first face; a control plate axially displaceable and rotatable about said axis of rotation, said control plate having a plurality of variable depth circumferential control grooves formed in both a first and second face of said control plate, said plurality of control grooves formed in said first face being directly opposed to those formed in said second face;

a second actuation plate axially fixed relative to said housing and rotatable about said axis of rotation, said second actuation plate having a plurality of variable depth circumferential actuation grooves formed in a face opposite to said second face of said control plate and having a collar axially extending to nonrotatably connect said second actuation plate to said first actuation plate; a plurality of rolling members, one each disposed in each pair of opposed actuation grooves and control grooves such that rotation of said first and second actuation plates relative to said control plate causes said rolling members to traverse said actuation grooves and said control grooves resulting in axial movement of said control plate and said first actuation plate toward said flywheel;

torque means to apply a braking torque on said control plate in response to a control signal.

2. The ball ramp clutch actuator of claim 1, wherein said torque means consists of an electrical coil for producing an electromagnetic field thereby applying an electromagnetic braking torque on said control plate.

3. The ball ramp clutch actuator of claim 2, wherein said coil is positioned at a peripheral edge of said control plate and mounted on said housing to electromagnetically link said control plate to said housing to provide a braking torque on said control plate.

4. The ball ramp clutch actuator of claim 1, wherein a plurality of axial splines are formed on said collar and a plurality of axial splines are formed on an inner surface of said first actuation plate, said splines on said collar engaging said splines on said first actuation plate to nonrotatably connect said first actuation plate to said second actuation plate while allowing axial movement of said first actuation plate.

5. The ball ramp clutch actuator of claim 1, wherein said control grooves and said actuation grooves are shaped to provide axial movement of said control plate and said first actuation plate toward said flywheel when said control plate is rotated in one direction with respect to said first and second actuation plates from a starting point thereof.

6. The ball ramp clutch actuator of claim 1, wherein said control grooves and said actuation grooves are shaped to provide axial movement of said control plate and said first actuation plate toward said flywheel when said control plate is rotated in either a clockwise or a counterclockwise direction from a starting point thereof with respect to said first and second actuation plates.

7. The ball ramp clutch actuator of claim 1, further comprising a thrust bearing disposed between said second actuation plate and said housing.

8. The ball ramp clutch actuator of claim 1, wherein said second actuation plate is attached to said housing and wherein said housing is attached to said flywheel.

9. A ball ramp actuator comprising:

a first actuation plate rotatable about an axis of rotation having a plurality of circumferential first actuation grooves formed in a face of said first actuation plate, said first actuation grooves having a variable axial depth;

a second actuation plate rotatable about said axis of rotation having a plurality of circumferential second actuation grooves formed in a face of said second actuation plate, said second actuation grooves having a variable axial depth and substantially identical to said first actuation grooves;

a connection means for nonrotatably connecting said first actuation plate to said second actuation plate;

a control plate rotatable about said axis of rotation having a plurality of circumferential first control grooves formed in a first face of said control plate and a plurality of circumferential second control grooves formed in a second face of said control plate, said first and second control grooves having a variable axial depth, said first control grooves being directly opposite to said second control grooves and said first control grooves at least partially opposed to respective said first actuation grooves and said second control grooves at least partially opposed to respective said second actuation grooves thereby forming a plurality of opposed pairs of said first and second control grooves and said first and second actuation grooves;

a plurality of rolling members interposed between said first actuation grooves and said first control grooves, and between said second actuation grooves and said second control grooves, one rolling member occupying each opposed pair of said first and second control grooves, and said first and second control grooves, said rolling members simultaneously traversing said first and second control grooves and said first and second actuation grooves as said control plate is rotated relative to said first and second actuation plates;

torque means for applying a braking torque on said control plate to cause said control plate to rotate relative to said first and second actuation plates.

10. The ball ramp actuator of claim 9, wherein said connection means is comprised of a splined collar connected to said second actuation plate and axially extending to engage said first actuation plate, said collar having a plurality of splines engaging a plurality of mating splines formed on an inner edge of said first actuation plate.

11. The ball ramp actuator of claim 9, wherein said torque means is comprised of an electrical coil disposed adjacent to said control plate.

12. The ball ramp actuator of claim 9, further comprising a clutch housing at least partially enclosing said first and second actuation plates and said control plate.

13. The ball ramp actuator of claim 12, further comprising an electrical coil attached to said housing and positioned to create an electromagnetic field in said control plate.

14. The ball ramp actuator of claim 9, further comprising a return spring for applying a force on said first actuation plate biasing said first actuation plate toward said second actuation plate.

15. The ball ramp actuator of claim 9, wherein said first and second control grooves are shaped to axially separate said first and second actuation plates from said control plate as said rolling elements traverse said first and second actuation grooves and said first and second control grooves when said control plate is rotated in one direction relative to said first and second actuation plates.

16. The ball ramp actuator of claim 9, wherein said first and second control grooves are shaped to axially separate said first and second actuation plates from said control plate as said rolling elements traverse said first and second actuation grooves and said first and second control grooves when said control plate is rotated in either a clockwise or a counterclockwise direction from a starting point thereof relative to said first and second actuation plates.

* * * * *